(12) United States Patent
Haimi-Cohen et al.

(10) Patent No.: US 10,091,518 B2
(45) Date of Patent: Oct. 2, 2018

(54) SYSTEMS AND METHODS FOR TRANSMISSION OF COMPRESSIVE SENSING DATA

(71) Applicant: Alcatel-Lucent USA Inc., Murray Hill, NJ (US)

(72) Inventors: Raziel Haimi-Cohen, Springfield, NJ (US); Hong Jiang, Warren, NJ (US); Jianwei Liu, Central, SC (US); Larry Liu, White House Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 367 days.

(21) Appl. No.: 14/627,344

(22) Filed: Feb. 20, 2015

(65) Prior Publication Data
US 2016/0249065 A1    Aug. 25, 2016

(51) Int. Cl.
| | |
|---|---|
| H04N 7/12 | (2006.01) |
| H04N 11/02 | (2006.01) |
| H04N 11/04 | (2006.01) |
| H04N 19/426 | (2014.01) |
| H04N 19/15 | (2014.01) |
| H04N 19/176 | (2014.01) |
| H04N 19/65 | (2014.01) |
| H04N 21/643 | (2011.01) |
| H04N 21/6437 | (2011.01) |

(Continued)

(52) U.S. Cl.
CPC ........... *H04N 19/428* (2014.11); *H04N 19/15* (2014.11); *H04N 19/176* (2014.11); *H04N 19/46* (2014.11); *H04N 19/65* (2014.11); *H04N 19/70* (2014.11); *H04N 19/90* (2014.11); *H04N 21/6437* (2013.01); *H04N 21/64322* (2013.01)

(58) Field of Classification Search
None
See application file for complete search history.

(56) References Cited

U.S. PATENT DOCUMENTS 6,493,342 B1 * 12/2002 Breslow ............. H04B 7/18584
                                                                370/394
8,929,456 B2 *  1/2015 Jiang ..................... H04N 19/30
                                                                375/240.01

(Continued)

OTHER PUBLICATIONS

C. Li, "An efficient augmented Lagrangian method with applications to total variation minimization", Springer Science+Business Media, Jul. 3, 2013, 24pgs, New York.

(Continued)

*Primary Examiner* — Chikaodili E Anyikire
(74) *Attorney, Agent, or Firm* — Harness, Dickey & Pierce, P.L.C.

(57) ABSTRACT

In one example embodiment, a transmitting device includes a memory configured to store computer-readable instructions and a processor configured to execute the computer-readable instructions. The processor is configured to prepare at least one packet, the at least one packet including a portion of a compressed representation of at least one data block, a packet offset value and a block identifier, the block identifier identifying the at least one data block, the packet offset value identifying the portion of the compressed representation of the at least one data block within the compressed representation of the at least one data block and broadcast the at least one packet.

12 Claims, 8 Drawing Sheets

(51) Int. Cl.
*H04N 19/70* (2014.01)
*H04N 19/46* (2014.01)
*H04N 19/90* (2014.01)

(56) References Cited

U.S. PATENT DOCUMENTS

| | | | | |
|---|---|---|---|---|
| 2004/0156369 | A1* | 8/2004 | Nakagawa | H04L 49/201 370/396 |
| 2010/0128998 | A1* | 5/2010 | Wegener | G06T 9/00 382/248 |
| 2011/0055178 | A1* | 3/2011 | Mark | G06F 3/0619 707/697 |
| 2012/0116548 | A1* | 5/2012 | Goree | A61B 5/1118 700/90 |
| 2012/0144130 | A1* | 6/2012 | Fossum | G06F 17/16 711/154 |
| 2013/0044820 | A1* | 2/2013 | Haimi-Cohen | H04N 19/176 375/240.24 |
| 2013/0086224 | A1* | 4/2013 | Teraguchi | G06F 17/30312 709/219 |

OTHER PUBLICATIONS

International Preliminary Report on Patentability from corresponding International Application PCT/US2016/017985, dated Aug. 22, 2017, and Notification Concerning Transmittal of International Preliminary Report on Patentability, dated Aug. 31, 2017.
"ITU-T H.264, Advanced video coding for generic audiovisual services, Series H: Audiovisual and Multimedia Systems, Infrastructure of audiovisual services—Coding of moving video", Telecommunications Standardization Sector of ITU, Recommendation ITU-T H.264, Apr. 1, 2013, pp. 1-732, XP055232958.
"H.265 Recommendation—High efficiency video coding", Apr. 1, 2013, XP055206562, URL:http://www.itu.int/rec/T-REC-H.265-201304-S/en.
Candes E J et al, "An Introduction to Compressive Sampling", IEEE Signal Processing Magazine, IEEE Service Center, Piscataway, NJ, US, vol. 25, No. 2, Mar. 1, 2008, pp. 21-30, XP011225660, ISSN: 1053-5888, DOI: 10.1109/MXP.2007.914731.
Wenger S, "H.264/AVC over IP", IEEE Transactions on Circuits and Systems for Videotechnology, IEEE Service Center, Piscataway, NJ, US, vol. 13, No. 7, Jul. 1, 2003, pp. 645-656, XP011099257, ISSN: 1051-8215, DOI: 10.1100/TCeVT.2003.814066.
International Search Report dated Apr. 29, 2016 for International Application No. PCT/US2016/017985.

* cited by examiner

SYSTEMS AND METHODS FOR TRANSMISSION OF COMPRESSIVE SENSING DATA

BACKGROUND

Video surveillance networks with hundreds or thousands of cameras/sensors are deployed in various places. Such networks typically require complex video compression at each camera/sensor, a reliable communication network between the cameras/sensors and a control center for transmitting the compressed video to the control center, and matching video decompression at the control center.

One existing solution is to equip each video camera/sensor with high efficiency video coders, such as H.264 or H.265, and transmit the compressed video over a reliable network to a control center, where each video stream is decompressed and analyzed or displayed. Such video coders achieve high compression rates, but they are quite complex. In addition, the compressed signal is very sensitive to channel errors. Therefore, various communication techniques need to be applied to make the transmission reliable, for example, retransmission (as in transmission control protocol (TCP)) or forward error correction. These techniques add significant complexity and significantly reduce the available payload data rate, especially in low power transmission which results in low SNR in the received signal. Furthermore, if the channel quality varies, the communication protocol is often designed for the worst case, which can significantly further reduce the bit rate available for compressed video.

An alternative solution is to use compressive sensing (CS) instead of conventional video coding. CS is a signal compression technique with advantageous properties for video surveillance applications. According to CS, the compression operation is very simple and may be integrated with the video acquisition process, using a camera/sensor including, but not limited to, a lensless camera/sensor. It is possible to detect anomalies in the compressive sensing domain without actually decompressing the video, and it is possible to decompress only the elements of the regions of the video that are of interest, and in the decoding process it is possible to separate the moving object(s) from the background object(s).

However, implementation of CS requires a simple, robust and low power protocol for transmission of CS data from the camera/sensor to the control center.

SUMMARY

Some example embodiments relate to methods and/or systems for transmission of CS video data over a network using a simple, low power protocol.

In one example embodiment, a transmitting device includes a memory configured to store computer-readable instructions and a processor configured to execute the computer-readable instructions. The processor is configured to prepare at least one packet, the at least one packet including a portion of a compressed representation of at least one data block, a packet offset value and a block identifier, the block identifier identifying the at least one data block, the packet offset value identifying the portion of the compressed representation of the at least one data block within the compressed representation of the at least one data block and broadcast the at least one packet.

In yet another example embodiment, the packet offset value identifies a position of the portion of the compressed representation of the at least one data block within the compressed representation of the at least one data block.

In yet another example embodiment, the processor is further configured to obtain the compressed representation of the at least one data block.

In yet another example embodiment, the compressed representation includes discrete measurements of an analog signal captured by a data capturing device.

In yet another example embodiment, the processor is configured to obtain the compressed representation of the at least one data block by applying a sensing matrix to the at least one data block.

In yet another example embodiment, the at least one packet further includes at least one of global metadata information and block metadata information, the block metadata information corresponding to the at least one data block and including information for reconstruction of the at least one data block.

In yet another example embodiment, the processor is configured to prepare the at least one packet by including an associated forward error correction (FEC) code for the at least one of the global metadata information and the block metadata information included in the at least one packet.

In yet another example embodiment, the processor is configured to prepare the at least one packet such that no forward error correction (FEC) code is included in the at least one packet for the portion of the compressed representation of the at least one data block.

In yet another example embodiment, the at least one data block is a video data block.

In one example embodiment, a receiving device includes a memory configured to store computer-readable instructions and processor configured to execute the computer-readable instructions. The processor is configured to receive at least one packet broadcasted by a transmitting device, the at least one packet including a portion of a compressed representation of at least one data block, a packet offset value and a block identifier, the block identifier identifying the at least one data block, the packet offset value identifying the portion of the compressed representation of the at least one data block within the compressed representation of the at least one data block, and process the at least one packet based on at least the packet offset value and the block identifier.

In yet another example embodiment, the processor is configured to process the at least one packet by, retrieving the packet offset value and the block identifier from the received at least one packet, forming a vector based on the retrieved packet offset value and the block identifier, the vector including the portion of the compressed representation of the at least one data packet, and processing the at least one packet using the formed vector.

In yet another example embodiment, the processor is configured to determine if one or more packets were lost during broadcasting of packets by the transmitting device. Upon determining that the one or more packets were lost during the broadcasting, the processor is configured to modify the formed vector to ignore entries in the formed vector that correspond to any portion of the compressed representation of the at least one data block included in the one or more lost packets, modify a sensing matrix, used at the transmitting device to determine the compressed representation of the at least one data block, to ignore entries of the sensing matrix corresponding to ignored entries of the formed vector, and reconstruct the at least one data block based on the modified vector and the modified sensing matrix.

In yet another example embodiment, the process is configured to extract target information upon processing the at least one packet.

In yet another example embodiment, the target information is data that is compressed, broadcasted and received at the receiving device over the communication channel.

In yet another example embodiment, the processor is configured to reconstruct the at least one data block based on the modified vector, the modified sensing matrix, and at least one of global and block metadata information retrieved from the at least one packet.

In yet another example embodiment, the data is video data, and the processor is configured to assemble the reconstructed at least one data block to reconstruct the video data.

In one example embodiment, a method includes receiving at least one packet broadcasted by a transmitting device, the at least one packet including a portion of a compressed representation of at least one data block, a packet offset value and a block identifier, the block identifier identifying the at least one data block, the packet offset value identifying the portion of the compressed representation of the at least one data block within the compressed representation of the at least one data block, and processing the at least one packet based on at least the packet offset value and the block identifier.

In yet another example embodiment, the processing processes the at least one packet by retrieving the packet offset value and the block identifier from the received at least one packet, forming a vector based on the retrieved packet offset value and the block identifier, the vector including the portion of the compressed representation of the at least one data packet, and processing the at least one packet using the formed vector.

In yet another example embodiment, the method further includes determining if one or more packets were lost during broadcasting of packets by the transmitting device. Upon determining that the one or more packets were lost during the broadcasting, the method further includes modifying the formed vector to ignore entries in the formed vector that correspond to any portion of the compressed representation of the at least one data block included in the one or more lost packets, modifying a sensing matrix, used at the transmitting device to determine the compressed representation of the at least one data block, to ignore entries of the sensing matrix corresponding to ignored entries of the formed vector, and reconstructing the at least one data block based on the modified vector and the modified sensing matrix.

In yet another example embodiment, the method further includes extracting target information upon processing the at least one packet.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
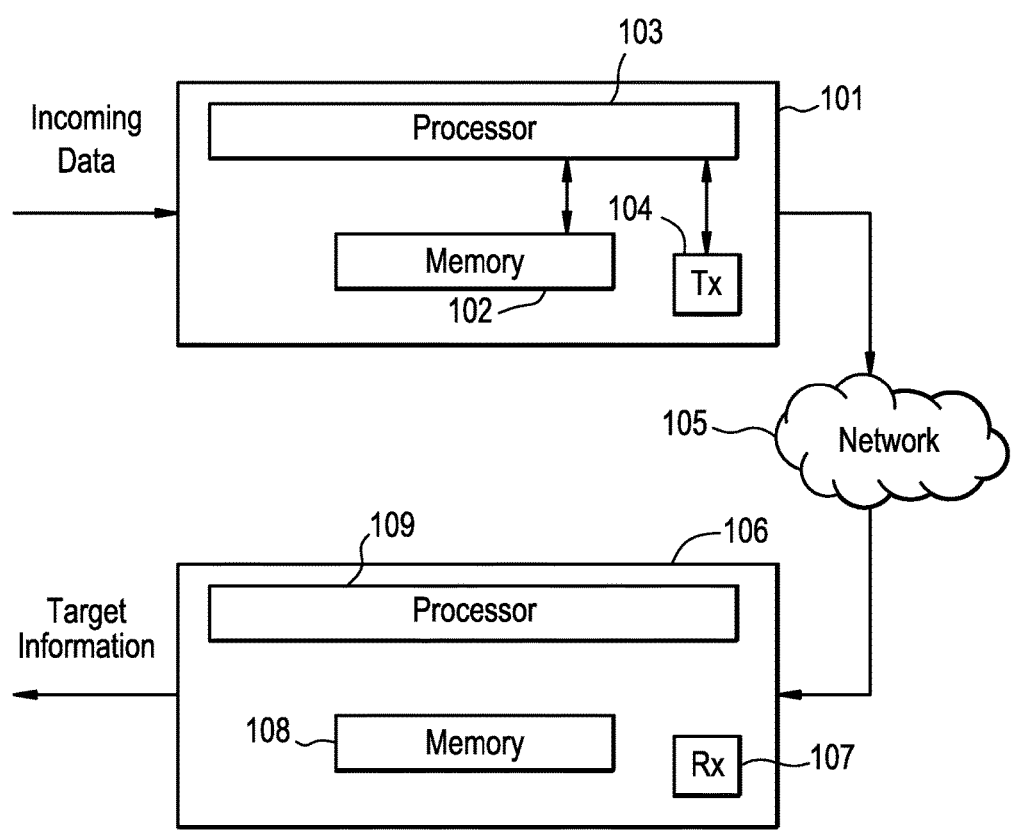
FIG. 1 depicts a system for implementing transmission of CS video data over a communication network, according to one example embodiment.

Various embodiments will now be described more fully with reference to the accompanying drawings. Like elements on the drawings are labeled by like reference numerals.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), graphics processing units (GPUs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged, and certain operations may be omitted or added to the process. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

As will be described below, example embodiments of the present application enable transmission of an incoming signal that has been compressed using compressive sensing methods over a network using a relatively simple, robust and/or low power protocol. While the example embodiments presented herein are described with reference to video signals as one particular type of signal, the example embodiments are also applicable to other types of signals including, but not limited to, still image signals, audio signals, acoustic signals, seismic signals, sonar signals, radar signals, medical imaging signals such as magnetic resonance imaging (MRI) signals and various other types of signals.

In one example embodiment, a CS encoder applies a linear operator to the incoming video signal to compute a measurements vector y of dimension m, where m is a positive integer. In one example embodiment, the incoming video signal is discrete, which may be represented by a vector x of dimension n, where n is a positive integer. In one example embodiment, the value of n may or may not be equal to the value of m. Accordingly, the linear operator may be represented by a sensing matrix A of dimension m×n and the measurements vector y is determined by applying the measurement matrix A to the vector x, for example by the vector-by-matrix operation y=Ax.

In one example embodiment, the incoming video signal is continuous and the linear operator is applied to the signal in the analog domain, and the measurements vector y is obtained by a receiving device by sampling the output of the linear operator. For example, in the case of a lensless camera, the incoming signal is an optical signal. The linear operator is applied in the electro-optical domain by selective summation of light rays, and the resulting electrical signal is sampled to produce the measurements vector y. In this example embodiment, in which the incoming video signal is analog, the representation y=Ax, described above with regard to the discrete incoming video signal may still be used, where x is a vector of dimension n which represents a discrete signal with sufficient resolution to accurately represent the original analog signal, and A is a sensing matrix that when applied to the vector x yields essentially the same measurements vector y that is produced by the original linear operator when applied to the original continuous video signal.

Accordingly, it will be appreciated that the discussion of the video signal vectors and sensing matrices in the example embodiments below, will be equally applicable to both instances of CS in the analog domain and in the digital domain.

In one example embodiment, the number of measurements m of the measurements vector y, is smaller than the dimension n of the incoming video signal (vector x), which is one reason why the measurements vector y may also be referred to as a compressed version of the vector x and the process of determining the measurement y from the vector x may be referred to as compressive sensing.

In some example embodiments, the sensing matrix A is a matrix, entries of which are randomly generated via for example, a random number generator or another functionally similar method for generating random or pseudo random numbers and sequences. One example of a randomly generated sensing matrix A is a matrix obtained by selecting a random subset of the rows of a transform matrix, such as the Walsh Hadamard transform matrix. In this case, the compressive measurements of the measurements vector y are obtained by applying the Walsh Hadamard transform matrix to the signal vector x and selecting a subset of the entries of the transformed vector as the measurements vector y, which corresponds to the randomly selected subset of rows of the Walsh Hadamard transform matrix. Consequently and in one example embodiment, if a measurements vector y is generated using the operation y=Ax, a modified measurements vector y' of dimension m'<m, may be generated by selecting m' random subsets of entries of y. This modified measurements vector y' is given by y'=A'x, where A' is a modified version of the sensing matrix A with dimension m'×n. The modified sensing matrix A' is obtained from the measurement matrix A by selecting rows of A that correspond to the selected entries in y. Generally the modified sensing matrix A' is of the same type as the sensing matrix A but with less rows.

The CS data which needs to be transmitted from the camera(s)/sensor(s) to the control center may include measurements (e.g., entries of the measurements vector y, which hereinafter may be referred to as compressive measurements) and other types of data, which may be referred to as "metadata". The compressive measurements are the bulk of CS data that are to be transmitted. A unique property of CS is that the quality of the reconstructed video degrades gracefully as the number of compressive measurements decreases.

According to example embodiments and because of the above described unique property of CS, if some compressive measurements are lost during transmission, a receiving device that receives video packets with measurements over the network ignores compressive measurements lost during transmission from a transmitting device to the receiving device and uses the compressive measurements which arrived. Since the received compressive measurements are a random subset of the entries of the measurements vector, reconstructing the video data based on the received compressive measurements results in minor degradation to the quality of the video signal. This is in stark contrast to conventional communication methods, where considerable efforts are put in to deliver the entire transmitted payload to the receiver, typically by adding forward error correction and/or some form of retransmission of lost/corrupted data. The elimination of the provisions and protocols which are usually set in place to guarantee that all of the transmitted video packets are delivered correctly to the receiving device reduces the complexity and power consumption of the sensors and enables using communications channels of relatively poor/low quality, and allows operation in a broadcast, unidirectional mode, where zero, one or several control centers may receive the video stream of any particular sensor.

In some example embodiments, instead of reconstructing the video data, the receiving device reconstructs parts of the received video data, which are selected as being of interest. Moreover, in some example embodiments, various types of information are extracted from the measurements without actually reconstructing the video, such as detecting presence, direction and/or speed of motion, or the presence, location and characteristics of objects, in various parts of the video. Therefore, throughout the disclosure, the term "reconstruct" may refer to the above described types of processing and any similar processing which extracts target/useful information from the received measurements.

In implementing the above inventive concepts, the following are taken into consideration.

Decompression of CS data is sensitive to transmission errors in the CS data received via a communication network. Therefore, the CS data are packed in datagrams (e.g., user datagram protocol (UDP)) and each datagram is protected by an error detection code. Received datagrams in which an error is detected are discarded, and no retransmission request for retransmission of datagrams received in error is sent to the transmitting device by the receiving device.

In order to decompress the CS data received via datagrams, the receiving device needs to know exactly which measurements were received and which measurements were lost. Therefore, each datagram contains an offset parameter (which may also be referred to as a packet offset identifier) which indicates which portion of the measurements is included in each datagram.

While reconstruction of the video data is robust to loss of some of the measurements, as described above, even approximate reconstruction of the video data may not be possible unless the metadata is received correctly and in full. Accordingly, the metadata is coded with a relatively strong forward error correction code and distributed among several datagrams, such that even if some datagrams are lost, the metadata may be restored from the received datagrams. In one example embodiment, the forward error correction code is only included for recovering the metadata and not the actual CS data, itself. Next, example embodiments of inventive concepts will be described.

FIG. 1 depicts a system for implementing transmission of CS video data over a communication network, according to one example embodiment.

As shown in FIG. 1, the system 100 includes a transmitting device 101, a communication medium 105 and a receiving device 106.

The transmitting device 101 may include a memory 102, a processor 103 and a transmitter 104 that may be in communication with one another, using any known or to be developed manner. The memory 102 includes computer-readable instructions stored thereon for partitioning captured video data into video data blocks, encoding the partitioned video data blocks using compressive sensing methods, which will be described below, and packing any one of a part of each compressed video data block, an entirety of a compressed video data block or portions and/or entirety of two or more compressed video data blocks, into video packets.

The transmitting device 101 further includes the transmitter 104 for transmitting datagrams (which may hereafter be referred to as data packets) over the communication medium 105 to the receiving device 106. The transmitter 104 may be any type of currently available and/or to be developed transmitter for transmitting data packets.

The transmitting device 101 further includes the processor 103, which is configured to execute the computer-readable instructions stored on the memory 102. The implementation of the computer-readable instructions by the processor 103, transforms the processor 103 into a special purpose processor for implementing the inventive concepts described below.

While not shown, in one example embodiment, the system 100 may further include at least one video capturing device such as a camera/sensor for capturing the incoming video data that is input into the transmitting device 101, as shown in FIG. 1.

In other example embodiments, the video data may be captured by at least one lensless camera, or any other equivalent device for generating measurements in the analog domain. Accordingly, the input to transmitting device 101 is the compressive measurements, which are determined outside of the transmitting device 101 in the analog domain.

Therefore, when the input is the compressive measurements, the processor 103 may no longer execute instructions for partitioning and encoding the input video data, as this has already been performed in the analog domain outside of the transmitting device 101.

In one example embodiment, when there are two or more video capturing devices, then the two or more video capturing devices may transmit their captured video data to the same transmitting device 101.

In one example embodiment, the identity or existence of the receiving device 106 may not be known to the transmitting device 101. Accordingly, the video data captured by the at least one video capturing device may be broadcasted by the transmitting device 101 and at any time a receiving device 106 may tune-in to receive (e.g., watch, analyze, etc.) the broadcasted data (e.g., by connecting to the URL of the transmitting device 101 via the Internet).

The communication medium 105 may be any type of communication network for transmitting data packets (which may also be referred to as simply packets) between the transmitting device 101 and the receiving device 106. The communication medium 105 may be a wired and/or wireless communication network such as, but not limited to, Ethernet over twisted pairs or WiFi local area networks based on the Institute of Electrical and Electronics Engineers' (IEEE) 802.11 standards.

The receiving device 106 may include a receiver 107, a memory 108, and a processor 109 that may be in communication with one another, using any known or to be developed means. The receiver 107 receives data packets from the transmitting device 101 via the communication medium 105.

The memory 108 includes computer-readable instructions stored thereon for unpacking the received data packets into a video data vector, decompressing the video data included in the video data vector in order to reconstruct each video data block that was encoded at the transmitting device 101, and assembling the reconstructed blocks to reconstruct the video data and/or retrieve target information captured by the camera and sent to the receiving device 106 by the transmitting device 101.

In one example embodiment, the receiving device 106 may be implemented at a control center (not shown), where the recreated video data is used for a particular purpose (e.g., monitoring a facility, etc.). However, the video packets sent by the transmitting device 101 may be sent (simultaneously or not) to two or more control centers, each of which has a receiving device 106 implemented therein.

In one example embodiment, the system 100 may further include a video/audio device for observing (watching and/or listening to) the recreated video/audio data.

In one example embodiment, the system 100 may include more than one receiving device 106. Accordingly, each receiving device may join the system 100 at any time in order to receive and observe the video data captured by the camera(s)/sensor(s) and broadcasted over the communication medium 105.

Figure 2:
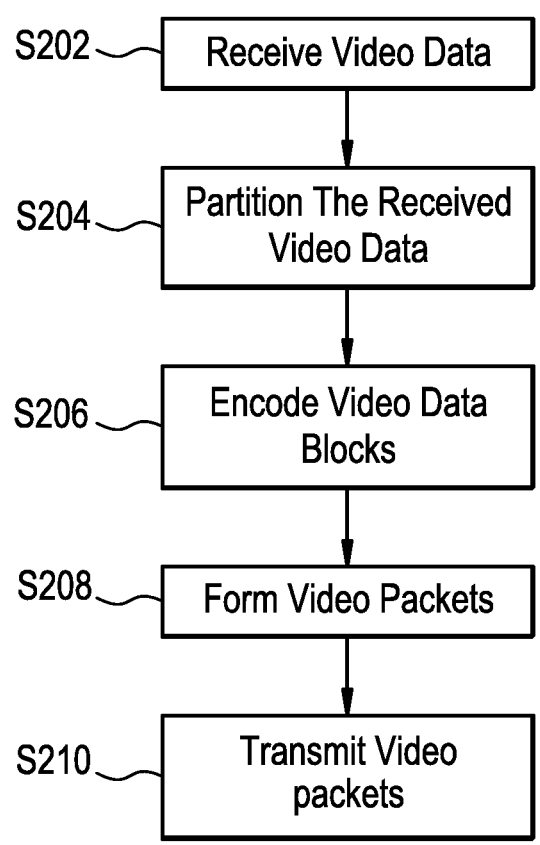
FIG. 2 is flowchart describing the process for encoding and transmitting captured video data, according to one example embodiment.

FIG. 2 is flowchart describing the process for encoding and transmitting captured video data, according to one example embodiment.

At S202, the processor 103 receives incoming video data captured by the camera(s)/sensor(s). At S204, the processor 103 partitions the received video data into a plurality of video data blocks. The partitioning of the received video data into a plurality of video data blocks will be described below with reference to FIGS. 3A and 3B.

Figure 3A:
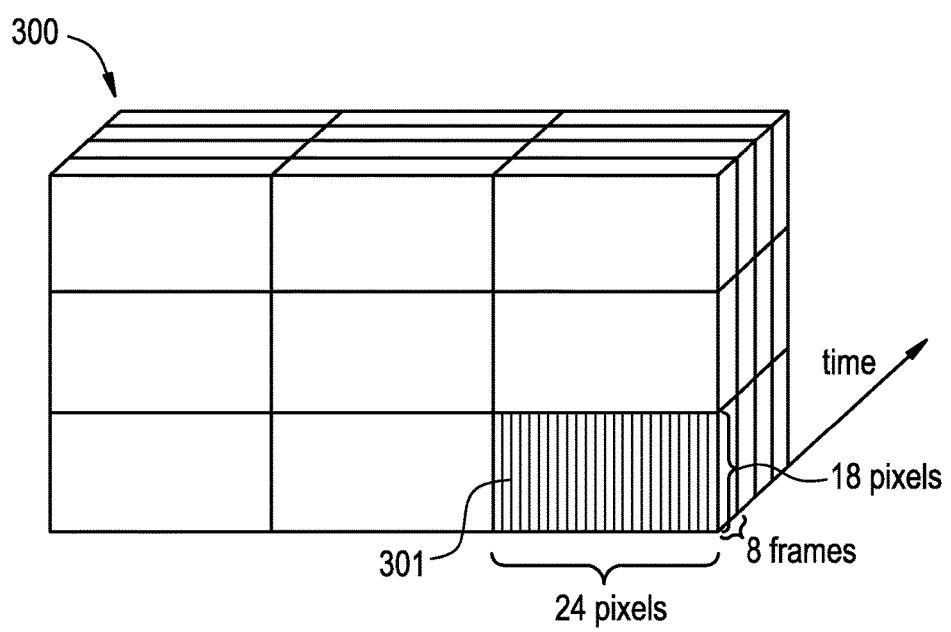
FIG. 3A illustrates a three dimensional representation of video data captured by a camera/sensor, according to one example embodiment.
Figure 3B:
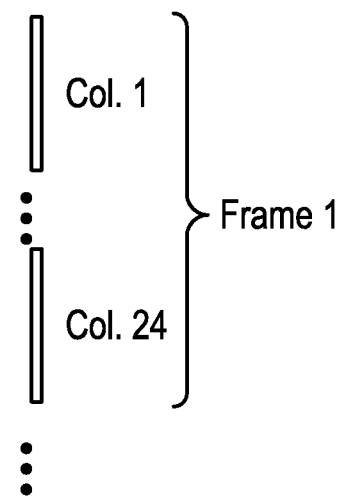
FIG. 3B illustrates a vector representation of each video data block, according to one example embodiment.
Figure 3B:
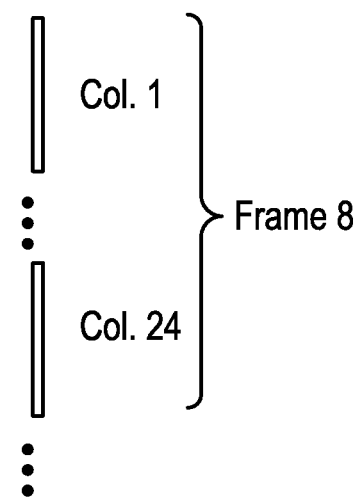

FIG. 3A illustrates a three dimensional representation of the incoming video data captured by a camera/sensor, according to one example embodiment. FIG. 3B illustrates a vector representation of one video data block, according to one example embodiment. Incoming video data may be captured in frames, where each frame corresponds to a particular time point and includes a two dimensional array of pixels. For simplicity, the incoming video data is assumed to be black and white video data, but the method is similarly applicable to color video data as well.

The plurality of video data blocks may be of a certain three dimensional size. FIG. 3A is an illustration of a video stream 300. As shown in FIG. 3A, 301 represents a single three-dimensional video data block. For example, the video data block 301 may be a three dimensional matrix of 18 pixels by 24 pixels by 8 frames. In other words, each three dimensional video data block is a two dimensional matrix of pixels of 18 by 24 pixels extended along a third time-axis, that represents the time point at which each two dimensional matrix was captured.

Thereafter, and as shown in FIG. 3B, the processor 103 may transform each three dimensional video data block 301 into a n×1 signal vector x, as described above, where in the example embodiments in which each video data block 301 is 18 by 24 pixels by 8 frames, n is equal to 1536 (8*24*18) pixels.

The inventive concepts are not limited to the example dimensions provided for the video data block 301 but may be any three dimensional block of any size. Furthermore, while in FIG. 3A all blocks are of the same size and shape and non-overlapping, the inventive concepts are also applicable to examples in which the blocks are of different shapes, sizes and possibly overlapping one another.

Furthermore, while the partitioning at S204 has been described with respect to video data blocks, the same partitioning may not be exactly applicable to other types of data (e.g., audio data/signals). However, depending on the type of the underlying signal, an appropriate partitioning may be applied, as known in the art.

In one example embodiment, the signal domain of the incoming video data may be finite. Accordingly, it is possible that the whole data would be one block and thus no partitioning may be needed. In another example embodiment, if the incoming data is still pictures, the picture may be one block and thus no partitioning may be needed. Accordingly, the processor 103 may not perform the partitioning at S204 and may proceed to S206 after S202 in cases where the whole data is one block.

Referring back to FIG. 2, at S206, the processor 103 encodes the n×1 signal vector x (or a sequence of signal vectors x, where each signal vector x corresponds to one partitioned data block, as described above). In one example embodiment, the process of encoding the signal vector x includes determining a measurements vector y for each signal vector x, based on compressive sensing methods, followed by forming a video data structure, which will be described below with reference to FIG. 5, that corresponds to one or more measurements vector y.

In one example embodiment and according to an example compressive sensing method, an m×n dimensional sensing matrix A, as described above, is applied to the n×1 signal vector x shown in FIG. 3B. In one example embodiment, the value of m is less than n. The process of determining the measurements vector y for each video data block will be discussed below with reference to FIG. 4.

Figure 4:
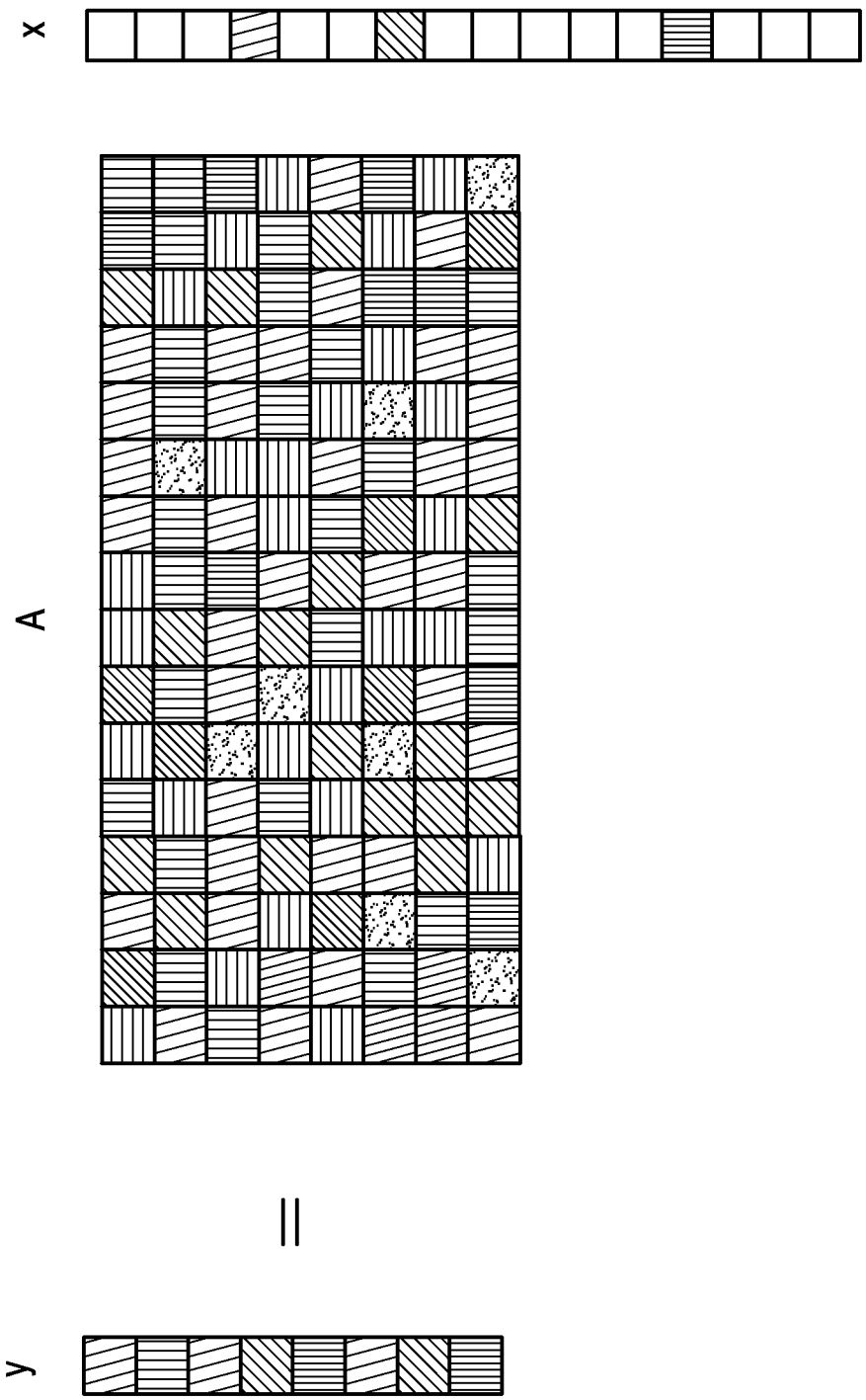
FIG. 4 illustrates the process of determining a measurements vector from a signal vector containing data of one video data block, according to one example embodiment.

FIG. 4 illustrates the process of determining a measurements vector from a signal vector containing data of one video data block, according to one example embodiment. As shown in FIG. 4, the m×n sensing matrix A is applied to (e.g., multiplied by) the n×1 signal vector x. The resulting measurements vector y, when the sensing matrix A is applied to the signal vector x, has a dimension of m×1. Accordingly, the measurements vector y represents a subset of the video data included in the signal vector x and due to its smaller size compared to the signal vector x, may be transmitted to the receiving device 106, more efficiently.

Once the measurements vector(s) y is determined, a video data structure corresponding to one or more of the measurements vector(s) y will be formed as part encoding signal vector(s) x.

Figure 5:
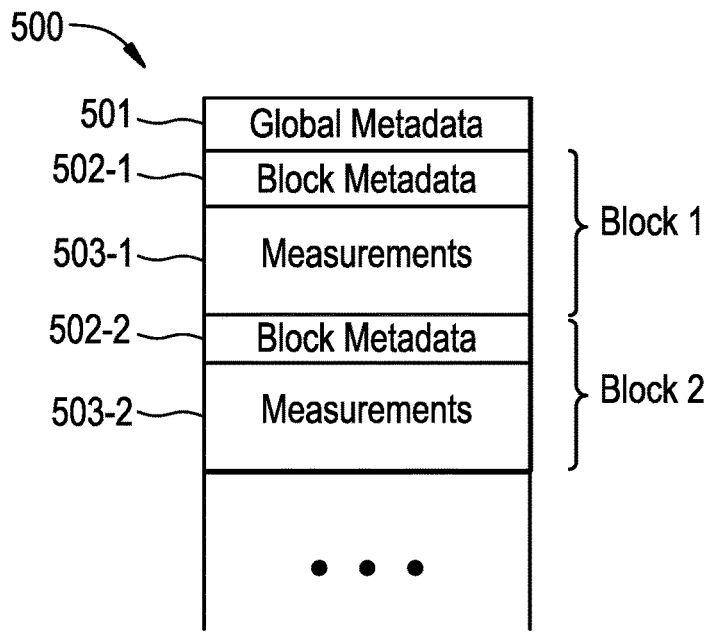
FIG. 5 illustrates a video data structure corresponding to one or more measurements vectors, according to one example embodiment.

FIG. 5 illustrates a video data structure corresponding to one or more measurements vectors, according to one example embodiment. As can be seen from FIG. 5, the video data structure 500 includes a global metadata section 501, a block metadata section 502-1, a measurements vector (e.g., $y_1$) 503-1, a block metadata 502-2 and a measurements vector (e.g., $y_2$) 503-2. Each pair of block metadata 502-$k$ and measurements vector 503-$k$ (with k=1, 2, 3, . . . ), corresponds to one video data block, represented by signal vector $x_k$, such as video data block 301 shown in FIG. 3B. For example, the block metadata 502-1 and measurements vector 503-1 correspond to the video signal $x_1$ of block number 1, the block metadata 502-2 and measurements vector 503-2 correspond to the encoded video signal $x_2$ of block number 2, etc.

In one example embodiment, the video data structure 500 may not include the global metadata section 501 if parameters included in the global metadata section are fixed within the system 100 and are known to both the transmitting device 101 and the receiving device 106 (e.g., programmed into both the transmitting device 101 and the received device 106 ahead of time). In one example embodiment, the definition of session parameters, which are represented by the global metadata 501, may be modified by an operator of the system 100 during operation. As such, the data structure 500 represents the video data stream of one session. The representation of consecutive multiple sessions may be achieved by concatenating several data structures 500, each of which includes a session specific global metadata 501.

In one example embodiment, the global metadata section 501 may include information including, but not limited to, specification of the video frame size and frame rate, specification of the block sizes, and information on the algorithm used to generate the sensing matrix A.

In one example embodiment, the block metadata section(s) 502-$k$ includes information related to the location of the one or more blocks of video data within the video stream 300, described above with reference to FIG. 3A, a seed of a random number generator which was used to generate the random elements of the sensing matrix A, and specifications of a quantizer used to quantize the measurements vector(s).

Referring back to FIG. 2, at S208, the processor 103 forms (forming may alternatively be referred to preparing) video packets each of which include encoded video data along with additional information, which will be discussed below with reference to FIG. 6.

Figure 6:
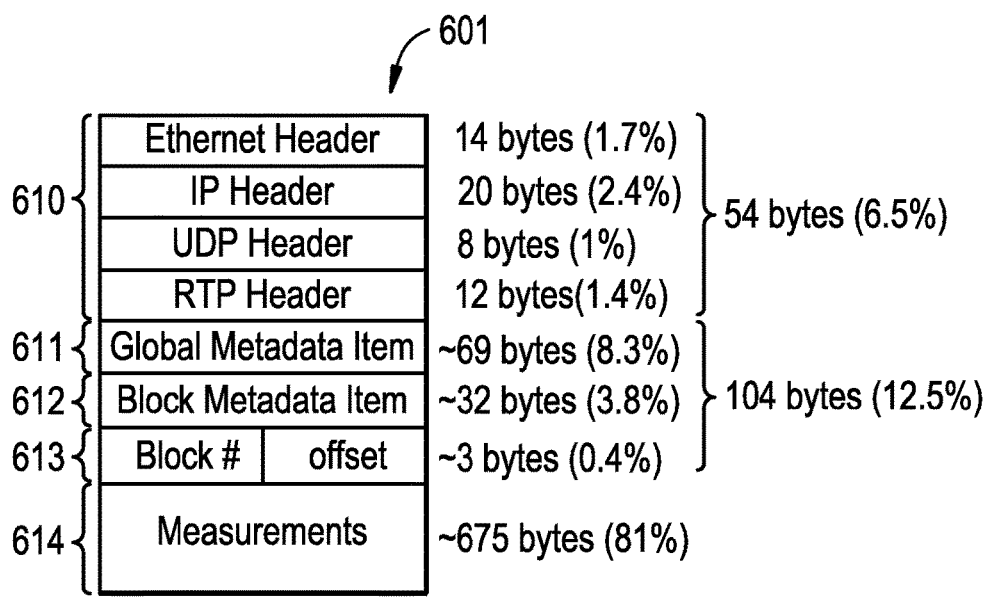
FIG. 6 illustrates the format of a single video packet, according to one example embodiment.

FIG. 6 illustrates the format of a single video packet, according to one example embodiment. As shown in FIG. 6, the processor 103 forms a video packet 601 including a standard header 610. The standard header 610 may include an Ethernet header, an IP header, a user datagram protocol (UDP) header, a real time protocol (RTP) header, etc. As shown in FIG. 6, in one example embodiment, the standard header 610 may occupy 54 bytes, which translates into 6.5% of the bytes available in the video packet 601, assuming that the video packet 601 has 833 bytes. However, FIG. 6 is only an example and the total size of the video packet 601 is not limited to that shown in FIG. 6. In this example embodiment, the UDP header contains an error detection code, which allows the receiving device 106 to detect corruption in the received video packet and delete it. In other example embodiments, error detection may be performed using different methods or not performed at all.

In forming the video packet 601, the processor 103 may further include sections 611, 612 and 613 in the video packet 601. Section 611 includes portions of the global metadata 501 discussed above with reference to FIG. 5. Section 612 includes portions of the block metadata 502 discussed above with reference to FIG. 5. Section 613 includes a block identifier (e.g., a block number) and packet offset value, which may be used by the receiving device 106 to reconstruct each video block from the corresponding block metadata 502 and measurements 503 and ultimately the entire video. As explained above, in other embodiments only a subset of the blocks may be reconstructed, or useful information may be extracted from the measurements 503 with any reconstruction.

As shown in FIG. 6, in one example embodiment, sections 611, 612 and 613 may occupy 104 bytes, which translates into 12.5% of the bytes available in the video packet 601. In some example embodiments, in sections 611 and/or 612, the global metadata section 501 and/or the block metadata section(s) 502 may be augmented by corresponding forward error correction (FEC) codes, using known methods.

In one example embodiment, the processor 103 may not include the full global metadata 501 and its associated forward error correction code in a single video packet. Instead, the processor 103 divides the global metadata into segments and distributes the segments among two or more video packets in a repeated, periodical fashion. In one example embodiment, assuming that the processor 103 divides the full global metadata 501 and its associated FEC code into six different segments, the processor 103 includes each of the six segments into a different video packet (e.g., video packets 1 to 6) and then periodically repeats the same in video packets 7 to 12, etc. (i.e., put the segment that was included in the video packet 1 into video packet 7, video segment included in the video packet 2, into video packet 8, etc.)

Distribution of the global metadata and its associated FEC code into different video packets in a periodic fashion, allows the receiving device 106 to tune in at any time, and after receiving 6 consecutive packets, recover the complete global metadata. Furthermore, even if some of the 6 consecutive packets are lost, the FEC enables the receiving device 106 to decode the complete global metadata from the received packets.

The above described division of the global metadata and its associated FEC code into 6 segments is just an example provided for illustrative purposes. However, the distribution of the global metadata in a periodic fashion may be carried out by dividing the global metadata and its associated FEC into any arbitrary number of segments.

Similarly, the processor 103 may not include the block metadata 502 (and its associated forward error correction code) for a particular block, in a single video packet. Instead, the processor 103 may divide the block metadata corresponding to a specific video data block into segments, and distribute the segments among video packets that contain measurements of the specific video data block. Accordingly, even if the receiving device 106 receives some, but not all of the video packets containing measurements of the specific video data block, the receiving device 106 may nevertheless be able to successfully reconstruct the specific video data block using the FEC. The FEC code used by the processor 103 may take on different forms. In some example embodiments it may be simple repetition. The FEC of the block metadata of a particular video data block may include a few copies of the block metadata associated with the particular video data block. Therefore, if a video packet is lost, the subsection of the block metadata included in the lost video packet may be recovered from another video packet corresponding to the particular video data block, which contains the same subsection as the one which was lost. In other example embodiments, a more efficient form of FEC codes, such as Reed Solomon coding, may be used instead for the same purpose of allowing reconstruction of the block metadata even if some video packets are lost.

As described above, the processor 103 includes, in section 613, one or more block identifiers and offset values (which may also be referred to as packet offset, offset value or packet offset value) associated with video data blocks, the corresponding measurements of which are included in the video packet 601.

In one example embodiment, the block identifier may be a block number that identifies one of the video data blocks determined at S202 to which measurements included in section 614 belong. In one example embodiment, the offset value indicates the start position of the measurements in section 614, in the encoded measurements vector y. The block identifier may be a single number or any other type of representation that identifies the one of the video blocks to which measurements included in section 614, belongs.

For example, assume that a measurements vector y includes 1200 bytes of measurements associated with video data shown in the video data block 301, shown in FIG. 3A. Furthermore, assume that in each video packet such as the video packet 601, 300 bytes may be allocated to measurements (e.g., section 614 has a size of 300 bytes). Accordingly, the processor 103 may form 4 video packets, such as video packet 601, to transmit the encoded video data of measurements vector y to the receiving device 106. Therefore, the block number in each of the four video packets will be the same (e.g., may be a single number (8 bits or 16 bits)). However, the packet offset of the first video packet is zero, the packet offset of the second video packet is 300, the packet offset of the third video packet is 600 and the packet offset of the fourth video packet is 900.

While the above example embodiment illustrates a sequential division of the measurements of the measurements vector y (e.g., measurements 1-200, measurements 200-400, etc.), the example embodiments are not limited to such sequential dividing of the measurements of the measurements vector y to be included in video packets. Alternatively, some example embodiments encompass any type of grouping of the measurements of the measurements vector y into smaller subsets to be included in video packets such as the video packet 106. Accordingly, the offset value may be any single parameter or group of parameters which is suitable for identifying the subset of the measurements which is included in video packet 106.

For example, the processor 103 may divide the measurements in the measurements vector y into 6 subsets where the first subset may contain measurements whose index, divided by 6 has a remainder of 1, and more generally, the k-th subset (k=1, . . . , 6) is the subset of all measurements whose indices, when divided by 6, has the same remainder as k divided by 6. In this example embodiment, the offset value may be the value of k, which is the remainder obtained by dividing the indices of the measurements in the subset by 6.

Finally and as described above, the processor 103 may include section 614 in the video packet 601. Section 106 may include the actual measurements of one or more video data blocks (i.e., measurements vector(s) y). In the example embodiment described above, section 114 includes 300 bytes of the 1200 bytes of encoded video data in measurements vector y. As shown in FIG. 6, in one example embodiment, section 614 may occupy the majority of the bytes available in the data pack 601. In this example, section 614 occupies 675 bytes, which translates into 81% of the bytes available in the video packet 601.

Referring back to FIG. 2, upon forming the video packet(s) at S208, the processor 103 transmits each formed video packet to the receiving device 106 at S210. The processor 103 may transmit each formed video packet via the transmitter 104 and through the communication medium 105.

Hereinafter, a process of receiving and reconstructing the transmitted video by the receiving device 106 will be described.

Figure 7:
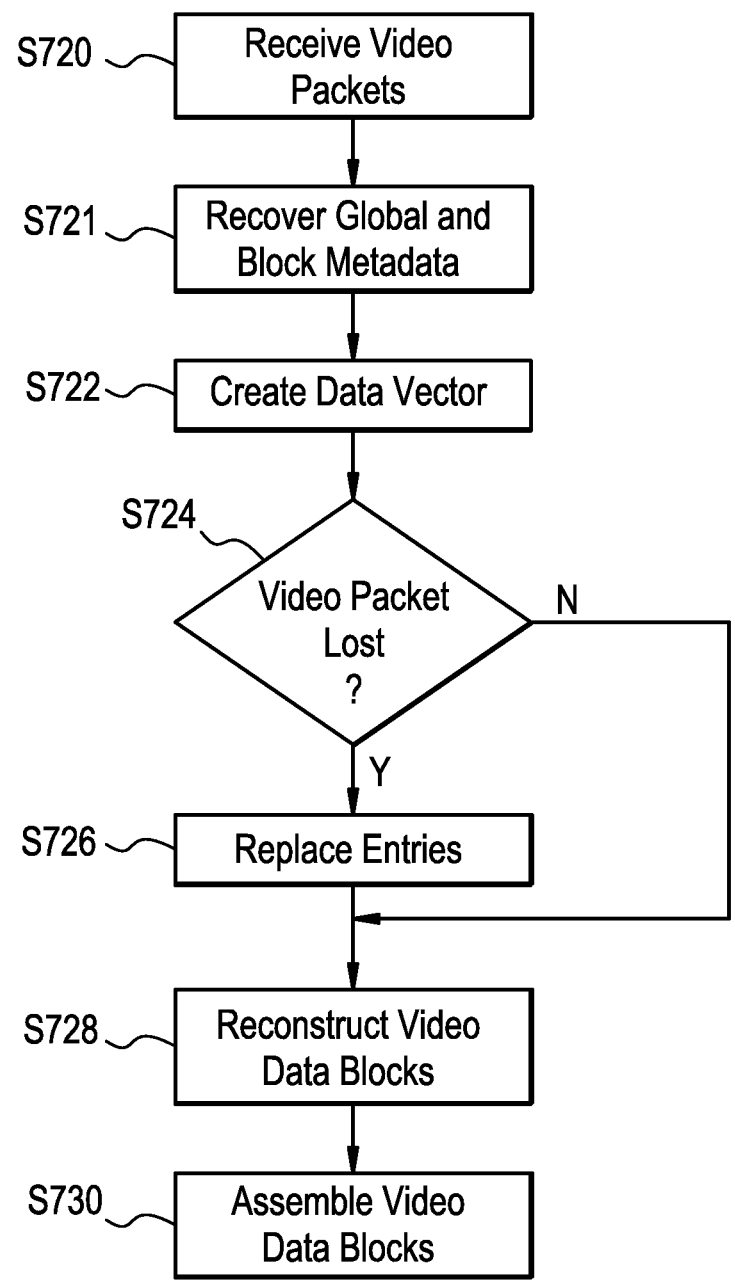
FIG. 7 is a flowchart describing a process for decoding transmitted video data and assembling video data, according to one example embodiment.

FIG. 7 is a flowchart describing a process for decoding received video data and assembling video data, according to one example embodiment.

At S720, receiving device 106, via the processor 109, receives video packets over the communication medium 105 from the transmitting device 101.

At S721, the processor 109 recovers the global metadata (if included in the received video packets) as well as the block metadata. In one example embodiment, the processor 109 recovers the global metadata upon receiving a sufficient number of packets (e.g., upon receiving 6 video packets described in the example embodiment above).

In one example embodiment, the processor 109 groups together all the received video packets corresponding to a particular video data block and recovers the block metadata, possibly using the FEC, as described above.

At S722, the processor 109 creates a data vector of the compressive measurements included in the received video packets.

At S724, the processor 109 determines if any video packets were lost during transmission from the transmitting device 101 to the receiving device 106. In one example embodiment, the processor 109 may determine if any packet was lost during the transmission as follows.

With reference back to the example described above in which one measurements vector y was packed into four video packets, assume that the first, second and fourth packets are received by the receiving device 106. Then, the processor 109 may determine that the third packet is lost, according to the following.

The processor 109, as described at S722, creates a data vector of the received video packets. For example, upon receiving the first video packet, the processor 109 examines the block number and the packet offset in the first video packet and determines that a first portion of the measurements vector y in the first video packet belongs to video data block 1 (assuming video data block 1 is the video data block 301 shown in FIG. 3A, the video data in which was encoded and sent via the four video packets). The processor 109 then determines that the packet offset value in the first packet is zero. Accordingly, the processor 109 populates the first 300 bytes of the data vector with the first portion of the measurements vector y in the first received video data packet.

Upon receiving the second video packet, the processor 109 examines the block number and the packet offset in the second video packet and determines that a second portion of the measurements vector y in the second video packet belongs to the same video data block 1 (assuming video data block 1 is the video data block 301 shown in FIG. 3A, the video data in which was encoded and sent via the four video packets). The processor 109 then determines that the packet offset value in the second packet is 300. Accordingly, the processor 109 populates the next 300 bytes of the data vector with the second portion of the measurements vector y in the second received video data packet.

Upon receiving the fourth video packet, the processor 109 examines the block number and the packet offset in the fourth video packet and determines that a fourth portion of the measurements vector y in the fourth video packet belongs to the same video data block 1 (assuming video data block 1 is the video data block 301 shown in FIG. 3A, the video data in which was encoded and sent via the four video packets). The processor 109 then determines that the packet offset value in the second packet is 900. Accordingly, the processor 109 leaves the next 300 bytes of the data vector empty and populates the last 300 bytes of the data vector with the fourth portion of the measurements vector y in the fourth received video data packet.

Accordingly, because the third segment of 300 bytes in the data vector is empty, the processor 109 determines that the third video data packet was lost.

If at S724, the processor 109 determines that no video packet was lost (and/or corrupted) during transmission then the process proceeds to S728, which will be described below. However, if at S724, the processor 109 determines that one or more video packets were lost during transmission, then at S726, the processor 109 modifies the data vector to ignore entries of the data vector that correspond to the video data in the lost video packet. In the example embodiment described above, the data vector includes first and second portions of the measurement data for the first 600 bytes of the data vector and the fourth portion of the measurement data for the last 300 bytes of the data vector, but the entries between the 600$^{th}$ byte and the 900$^{th}$ byte of the data vector are replaced with zeros or are deleted, as will be further described below.

As described above, one of the example advantages of inventive concepts is that the receiving device 106 does not send any retransmission request (also, the received video packets do not include any retransmission protocol) to the transmitting device 101 to resend the third video packet that was lost during transmission. Furthermore, the received video packets do not include any FEC code for recovering a third portion of the measurement data in the third video packet other than FEC code for recovering the global metadata and the block metadata in the third lost video packet.

In one example embodiment, because the global metadata and the block metadata included in the four video packets received at the receiving device are the same, the processor 109, for purposes of reconstructing the video data block 1, recovers the global metadata and the block metadata of the third lost video packet by using the global metadata and the block metadata of the first, second and fourth video packets that were successfully received at the receiving device 106.

Thereafter, the process proceeds to S728, where the processor 109 reconstructs one or more video data blocks, the measurement data of which has been received at the processor 109. Stated differently, the processor 109 decompresses the measurement data to recover the video data in the received video packets that were previously compressed using compressive sensing methods at the transmitting device 101, as described above.

In one example embodiment, the processor 109 decompresses the received encoded video data as follows, which will be described with reference to FIG. 8.

Figure 8:
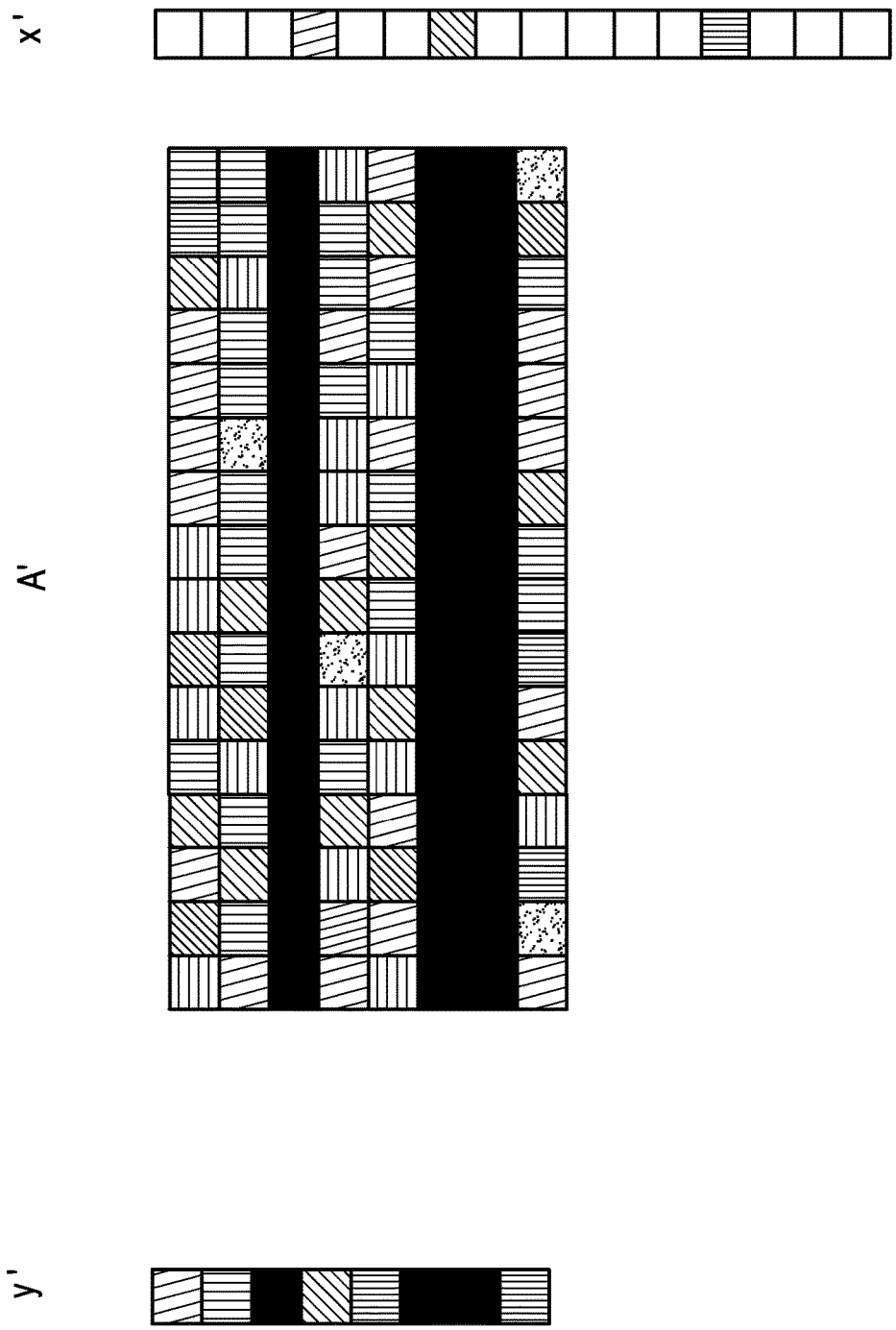
FIG. 8 illustrates decompression of the received encoded video data, according to one example embodiment.

FIG. 8 illustrates decompression of the received encoded video data, according to one example embodiment.

As described above, the data vector created by the processor 109 at S722 may be missing some of its entries due to loss of video packets during transmission. Accordingly, instead of receiving the complete measurements vector y, transmitted through video packets by the transmitting device 101, a measurements vector ŷ, some entries of which are missing, is received by the processor 109. Let y' be a vector obtained from the measurements vector ŷ by deleting the missing entries of the measurements vector ŷ FIG. 8 illustrates an example of the measurements vector y', in which the deleted missing entries are shown as blacked-out entries. Furthermore, FIG. 8 illustrates a sensing matrix A' that is a modified version of the sensing matrix A, in which the rows of the sensing matrix A corresponding to the missing entries of the measurements vector ŷ are deleted (shown as blacked-out rows in FIG. 8). Accordingly, the processor 109 may perform the reconstruction of the video data block(s) based on equation y'=A'x instead of y=Ax used by the transmitting device 101 in determining the measurements vector y.

In one example embodiment and in a more computationally advantageous embodiment, instead of deleting entries of the measurements vector ŷ and deleting corresponding rows of the sensing matrix A, the processor 109 replaces the blacked-out entries in the measurements vector ŷ with zeros to obtain the measurements vector y'. Similarly, the processor 109 replaces rows in the sensing matrix A' that correspond to the missing entries in the measurements vector ŷ with zeros. Accordingly, instead of applying the sensing matrix A to the data vector ŷ, the processor 109 applies a modified version of the sensing matrix A, shown as A' in FIG. 8, to the measurements vector y'.

In one example embodiment, the information on the sensing matrix A is retrieved by the processor 109, from the global metadata included in the received video packets.

In another example embodiment, the sensing matrix A' is obtained by multiplying the sensing matrix A by a m×m diagonal matrix D whose diagonal elements are one in every row, except for the rows which correspond to lost measurements, where the corresponding diagonal values are zero (i.e., A'=DA). Regardless of the exact method used to determine the sensing matrix A', the sensing matrix A', is designed such that in reconstructing the video data block(s), the lost measurements are ignored/excluded.

Thereafter and in one example embodiment, in order to determine an estimate of the signal vector x, denoted as x' in FIG. 8, the processor 109 finds a solution to the following constrained minimization problem $$x'=\min_x \|Sx\|_1 \, s \cdot t \cdot y'=A'x \qquad (1)$$

where S is a sparsifying operator (i.e., Sx is a sparse vector), x' is an estimate of the signal vector x encoded and transmitted by the transmitting device 101, y' is the vector obtained from the received measurements vector ŷ, and A' is a modified version of the sensing matrix A. In some example embodiments, different types of sparsifiers may be used. Examples of different types of sparsifiers may include any known sparsifier such as sparsifiers useful for video reconstruction discussed in a paper by Chengbo Li, et al. titled "An Efficient Augmented Lagrangian Method With Applications To Total Variation Minimization", published in 2013, the entire content of which is incorporated herein by reference.

Once the processor 109 determines the vector x', then entries of the video data block (e.g., video data block 301 described in the example embodiment above), are reconstructed using entries of the vector x'. In reconstructing video data block 301, the processor 109 uses the block metadata in the received video packets that include information necessary for reconstruction of the video data block 301.

The processor 109 repeats the process described above for reconstructing video data block 301 (e.g., the process described with reference to S720 to S728 of FIG. 7), for each video data block, the video data of which was encoded and transmitted to the receiving device 106 by the transmitting device 101.

Referring back to FIG. 7, after each video data block is reconstructed, at S730 the processor 109 assembles the reconstructed video data blocks to recreate the video that was captured by the camera(s)/sensor(s) at the transmitting side of the system 100.

In one example embodiment, the processor 109 examines the block index information included in the block metadata information of each block to assemble the video data blocks to recreate the video. The block index information provides a three dimensional representation of each video data block in relation to all of the video data blocks, as illustrated in and discussed above with relation to FIGS. 3A and 3B.

While the example embodiments describe the process of compressing, sending, receiving and decompressing each video data block individually and once at a time, in one example embodiment, portions of video data included in two or more video data blocks may be interleaved, so that some of the packets contain portions of the block metadata and portions of the measurements corresponding to the two or more video data blocks.

For example, in the example embodiment described above, instead of each video packet including 300 bytes of a single video data block, the 300 bytes payload in each video packet may include 6 subsections of 50 bytes from 6 different video data blocks. In this case, the block metadata information, the block numbers and the packet offset values will be modified by the processor 103 of the transmitting device 101, to clearly indicate each video data block's corresponding block metadata information and the corresponding offset values, in order for the receiving device 106 to correctly reconstruct each video data block. An advantage of interleaving two or more video data blocks is that if one video packet is lost during transmission, then a smaller portion of measurements of each video data block is lost and thus the video data may be reconstructed and recovered more accurately. In the Example embodiment described above, 50 bytes of each video data block is lost as opposed to 300 bytes of a single video data block.

Furthermore, in the case of burst loss, where several consecutive video packets are lost during transmission, the loss of data is distributed over several blocks and no single block is corrupted to the point that it cannot be reconstructed at an acceptable level. In the example embodiment where the 6-block interleaving is used, if 4 consecutive packets are lost than each of the video data blocks is missing only 200 measurements, which are 16.7% of the data, and similarly only 18% of the block metadata of each video data block may be recoverable. Using the FEC codes described above, the block metadata of each video data block may be fully reconstructed and the available measurements of each video data block are sufficient for reconstruction of the video data.

In some example embodiments, the measurements of each video data block may be further compressed at the transmitting device 101 using well known techniques such as variable length coding. For example, as an example of variable length coding, arithmetic coding may be used. According to arithmetic coding, the size of the measurement in each video packet may be further reduced. When each video packet is received at the receiving device 106, the receiving device 106, applies arithmetic coding decompression to obtain the measurements in the packet.

Variations of the example embodiments are not to be regarded as a departure from the spirit and scope of the example embodiments, and all such variations as would be apparent to one skilled in the art are intended to be included within the scope of this disclosure.

What is claimed:
1. A transmitting device comprising:
at least one memory configured to store computer-readable instructions; and
at least one processor configured to execute the computer-readable instructions to cause the transmitting device to,
obtain a compressed representation of at least one data block, obtaining the compressed representation including determining a measurements vector by applying a compressive sensing matrix to a signal vector representing the at least one data block, the measurements vector including compressive measurements representing a subset of data included in the signal vector,
prepare at least one packet to include,
a portion of the compressive measurements included in the measurements vector of the compressed representation of the at least one data block,
a block identifier identifying the at least one data block,
a packet offset value identifying a position of the portion of the compressive measurements within the measurements vector of the compressed representation of the at least one data block,
at least one of global metadata information and block metadata information for enabling reconstruction of the at least one data block, the global metadata information including information on an algorithm used to generate the compressive sensing matrix, and the block metadata information corresponding to the at least one data block and including a seed of a random number generator used to generate random elements of the compressive sensing matrix, and
at least one forward error correction (FEC) code for enabling recovery of the at least one of the global metadata information and the block metadata information upon a subset of the at least one packet being lost during transmission, wherein the at least one packet does not include an FEC code for recovering the portion of the compressive measurements included in the lost subset of the at least one packet, and transmit the at least one packet to a receiving device.
2. The transmitting device of claim 1, wherein the compressed representation includes discrete measurements of an analog signal captured by a data capturing device.
3. The transmitting device of claim 1, wherein the at least one data block is a video data block.
4. A receiving device comprising:
at least one memory configured to store computer-readable instructions; and at least one processor configured to execute the computer-readable instructions to cause the receiving device to,
receive at least one packet from a transmitting device, the at least one packet including,
a portion of compressive measurements included in a measurements vector of a compressed representation of at least one data block, the compressive measurements representing a subset of data included in a signal vector representing the at least one data block,
a block identifier identifying the at least one data block, and
a packet offset value identifying a position of the portion of the compressive measurements within the measurements vector of the compressed representation of the at least one data block,
retrieve the packet offset value and the block identifier from the received at least one packet,
form a data vector representing the at least one data block based on the retrieved packet offset value and the retrieved block identifier, the formed data vector including the portion of the compressive measurements included in the measurements vector of the compressed representation of the at least one data block,
determine whether any packets were lost during transmission, and in response to determining that one or more packets are lost,
modify the formed data vector to ignore entries of the formed data vector that correspond to any portion of the compressive measurements within the measurements vector of the compressed representation of the at least one data block included in the one or more lost packets,
modify a compressive sensing matrix to ignore rows of the compressive sensing matrix corresponding to the ignored entries of the modified data vector, and
reconstruct the at least one data block based on the modified data vector and the modified compressive sensing matrix.

5. The receiving device of claim 4, wherein, in response to determining that no packets were lost during transmission, the at least one processor is configured to execute the computer-readable instructions to cause the receiving device to,
process the at least one packet using the formed data vector, and
extract target information upon processing the at least one packet.

6. The receiving device of claim 5, wherein the target information is data that is compressed, broadcasted and received at the receiving device over a communication channel.

7. The receiving device of claim 4, wherein
the at least one packet further includes,
at least one of global metadata information and block metadata information for enabling reconstruction of the at least one data block, and
at least one forward error correction (FEC) code for enabling recovery of the at least one of the global metadata information and the block metadata information of a lost packet corresponding to the at least one data block, and in response to determining that the one or more packets are lost, the at least one processor is configured to execute the computer-readable instructions to cause the receiving device to,
recover the at least one of the global metadata information and the block metadata information of the one or more lost packets using the at least one FEC code,
generate the compressive sensing matrix based on the recovered at least one of the global metadata information and the block metadata information, and
reconstruct the at least one data block based on the modified data vector, the modified compressive sensing matrix, and the recovered at least one of the global metadata information and the block metadata information.

8. The receiving device of claim 7, wherein
the data is video data, and
the at least one processor is configured to execute the computer-readable instructions to cause the receiving device to assemble the reconstructed at least one data block to reconstruct the video data.

9. A method comprising:
receiving at least one packet from a transmitting device, the at least one packet including,
a portion of compressive measurements included in a measurements vector of a compressed representation of at least one data block, the compressive measurements representing a subset of data included in a signal vector representing the at least one data block,
a block identifier identifying the at least one data block, and
a packet offset value identifying a position of the portion of the compressive measurements within the measurements vector of the compressed representation of the at least one data block,
retrieving the packet offset value and the block identifier from the received at least one packet,
forming a data vector representing the at least one data block based on the retrieved packet offset value and the retrieved block identifier, the formed data vector including the portion of the compressive measurements included in the measurements vector of the compressed representation of the at least one data block,
determining whether any packets were lost during transmission, and in response to determining that one or more packets are lost,
modifying the formed data vector to ignore entries of the formed data vector that correspond to any portion of the compressive measurements within the measurements vector of the compressed representation of the at least one data block included in the one or more lost packets,
modifying a compressive sensing matrix to ignore rows of the compressive sensing matrix corresponding to the ignored entries of the modified data vector, and
reconstructing the at least one data block based on the modified data vector and the modified compressive sensing matrix.

10. The method of claim 9, further comprising:
in response to determining that no packets were lost during transmission, processing the at least one packet using the formed data vector, and extracting target information upon processing the at least one packet.

11. The method of claim 9, wherein
the at least one packet further includes,
- at least one of global metadata information and block metadata information for enabling reconstruction of the at least one data block, and
- at least one forward error correction (FEC) code for enabling recovery of the at least one of the global metadata information and the block metadata information of a lost packet corresponding to the at least one data block, and the method further comprises, in response to determining that the one or more packets are lost,
- recovering the at least one of the global metadata information and the block metadata information of the one or more lost packets using the at least one FEC code,
- generating the compressive sensing matrix based on the recovered at least one of the global metadata information and the block metadata information, and
- reconstructing the at least one data block based on the modified data vector, the modified compressive sensing matrix, and the recovered at least one of the global metadata information and the block metadata information.

12. The method of claim 11, wherein the data is video data, and the method further comprises assembling the reconstructed at least one data block to reconstruct the video data.

* * * * *